(12) United States Patent
Hu

(10) Patent No.: US 10,691,692 B2
(45) Date of Patent: Jun. 23, 2020

(54) COMPUTER-IMPLEMENTED METHOD OF EXECUTING A QUERY IN A NETWORK OF DATA CENTRES

(71) Applicant: Fujitsu Limited, Kawasaki-shi, Kanagawa (JP)

(72) Inventor: Bo Hu, Winchester (GB)

(73) Assignee: FUJITSU LIMITED, Kawasaki (JP)

( * ) Notice: Subject to any disclaimer, the term of this patent is extended or adjusted under 35 U.S.C. 154(b) by 511 days.

(21) Appl. No.: 15/444,816

(22) Filed: Feb. 28, 2017

(65) Prior Publication Data

US 2017/0329824 A1 Nov. 16, 2017

(30) Foreign Application Priority Data

Apr. 29, 2016 (DE) ........................ 10 2016 207 472
Apr. 29, 2016 (GB) ................................... 1607542.6

(51) Int. Cl.
*G06F 17/30* (2006.01)
*G06F 16/2455* (2019.01)
(Continued)

(52) U.S. Cl.
CPC ........ *G06F 16/2455* (2019.01); *G06F 9/5027* (2013.01); *G06F 9/5066* (2013.01);
(Continued)

(58) Field of Classification Search
CPC .. G06F 16/2455; G06F 16/285; G06F 9/5027; G06F 9/5066; H04L 41/044; H04L 67/1097
See application file for complete search history.

(56) References Cited

U.S. PATENT DOCUMENTS 8,145,742 B1 * 3/2012 Parker ..................... H04L 41/00
709/223
8,572,158 B2 10/2013 Shuster
(Continued)

FOREIGN PATENT DOCUMENTS

CN 103885829 6/2014
CN 104158879 11/2014
(Continued)

OTHER PUBLICATIONS

Panos Kalnis, et al., "An Adaptive Peer-to-Peer Network for Distributed Caching of OLAP Results", ACMSIGMOD, Jun. 4-6, 2002, pp. 25-36.
(Continued)

*Primary Examiner* — Huawen A Peng
(74) *Attorney, Agent, or Firm* — Staas & Halsey LLP

(57) ABSTRACT

A computer-implemented method of executing a query in a network of data centres, the method comprising a preparation stage and an execution stage; wherein the preparation stage includes: each data centre providing information relating to data centre parameters and/or proximity, allowing arrangement of the data centres in a dynamic hierarchical cluster topology of a parent data centre and child data centres, each child data centre having its own local data sequence which is to be processed by individual analysis tasks of the query, the child data centres together forming a cluster of similar and/or proximate data centres, the cluster having a single parent data centre; and the execution stage includes: the parent data centre sending the tasks to the child data centres and the child data centres sending to the parent data centre a sequence of outcomes derived from the local data sequence and the tasks; wherein both a child data centre and its parent data centre cache executed tasks executed by
(Continued)

the child and the sequence of outcomes of the tasks executed by the child data centre.

14 Claims, 9 Drawing Sheets

(51) Int. Cl.
*G06F 16/28* (2019.01)
*G06F 9/50* (2006.01)
*H04L 12/24* (2006.01)
*H04L 29/08* (2006.01)

(52) U.S. Cl.
CPC .......... *G06F 16/285* (2019.01); *H04L 41/044* (2013.01); *H04L 67/1097* (2013.01)

(56) References Cited

U.S. PATENT DOCUMENTS

| | | | |
|---|---|---|---|
| 8,645,957 B2 | 2/2014 | Rao et al. | |
| 8,909,786 B2 | 12/2014 | Lee et al. | |
| 9,418,455 B1* | 8/2016 | Wong | G06T 11/206 |
| 9,471,350 B2* | 10/2016 | Pavlas | G06F 9/45558 |
| 2009/0113323 A1 | 4/2009 | Zhao et al. | |
| 2010/0172485 A1 | 7/2010 | Bourke et al. | |
| 2012/0197959 A1* | 8/2012 | Oliver | G06F 9/5027 709/201 |
| 2013/0290976 A1 | 10/2013 | Cherkasova et al. | |
| 2014/0149493 A1 | 5/2014 | Acer et al. | |
| 2014/0196030 A1* | 7/2014 | Deshpande | G06F 9/45558 718/1 |
| 2014/0282824 A1 | 9/2014 | Lango et al. | |
| 2014/0325051 A1 | 10/2014 | Shah et al. | |
| 2015/0089203 A1 | 3/2015 | Kline et al. | |
| 2015/0256412 A1 | 9/2015 | Dominick et al. | |
| 2015/0293885 A1 | 10/2015 | Buyse et al. | |
| 2015/0319081 A1 | 11/2015 | Kasturi et al. | |

FOREIGN PATENT DOCUMENTS

| | | |
|---|---|---|
| CN | 104239141 | 12/2014 |
| EP | 2500823 | 9/2012 |
| KR | 10-2015-0080183 | 7/2015 |
| WO | 2014/205585 A1 | 12/2014 |

OTHER PUBLICATIONS

Prasad M. Deshpande, et al., "Caching Multidimensional Queries Using Chunks", SIGMOD, 1998, pp. 259-270.
Siqi Ji, et al., "Wide Area Analytics for Geographically Distributed Datacenters", Tsinghua Science and Technology, vol. 21, No. 2, Apr. 2016, pp. 125-135*.
Ashish Vulimiri, et al., "WANalytics: Analytics for a Geo-Distributed Data-Intensive World", 7th Biennial Conference on Innovative Data Systems Research, 2015, 9 pages*.
Panos Kalnis, et al. "Proxy-Server Architectures for OLAP", ACMSIGMOD, 2001, pp. 367-378.
Michael Lawrence et al., "The OLAP-Enabled Grid: Model and Query Processing Algorithms", Proceedings of the $20^{th}$ International Symposium on High-Performance Computing in an Advanced Collaborative Environment, 2006, pp. 1-7.
Donald Kossmann, "The State of the Art in Distributed Query Processing", ACM Computing Surveys, vol. 32, No. 4, Dec. 2000, pp. 422-469.
UK Search Report dated Oct. 17, 2016 in UK Patent Application No. GB1607542.6*.
"Optimization of RSync Differential Algorithm for Document Management Software" Prior Art Database, ip.com No. XPCOMGGGi993.240, Aug. 2010, 7 pages.
Ashish Vulimiri, et al., "WANalytics: Analytics for a Geo-Distributed Data-Intensive World", 7th Biennial Conference on Innovative Data Systems Research (CIDR '15), Jan. 2015, 9 pages.
Panos Kalnis, et al., "An Adaptive Peer-to-Peer Network for Distributed Caching of OLAP Results", ACMSIGMOD, 2002, 12 pages.
Chuan Lei, "Redoop Infrastructure for Recurring Big Data Queries", Proceedings of the VLDB Endowment, vol. 7, No. 13, 2014, 4 pages.
Extended European Search Report dated Oct. 10, 2017 in European Patent Application No. 17163095.7.

* cited by examiner

COMPUTER-IMPLEMENTED METHOD OF EXECUTING A QUERY IN A NETWORK OF DATA CENTRES

CROSS-REFERENCE TO RELATED APPLICATIONS

This application claims the benefit of United Kingdom Application No. 1607542.6, filed Apr. 29, 2016, in the United Kingdom Intellectual Property Office, and German Application No. 102016207472.5, filed Apr. 29, 2016, in the German Intellectual Property Office, the disclosures of which are incorporated herein by reference.

BACKGROUND

1. Field

The present invention relates to handling wide-area geographically distributed analytics. The invention finds multiple applications in today's world, where both data and processing are often distributed. A particular application is in the distribution of tasks to data centres. A data centre can be defined as a group of networked computing resources/computers (typically servers) which can be used by organisations for remote storage, processing or distribution of large amounts of data. Data centres normally present redundant resources and redundant data communication connections, etc.

Currently, the focus in the prior art is on how to distribute data processing task across different machines within one single data centre. The unique character in this situation is that:
1. Network connection within one data centre is normally homogeneous. When considering locality of data and processing units, network heterogeneity normally does not feature in the optimisation method.
2. Influence of the uplink and downlink transfer of network are also less significant when all the process units and data are held in a single data centre with fast network connections.
3. Cost of network communication sometimes is considered less expensive compared to the cost of disk I/O. This is due to the fact that the speed of network within single data centres is normally much higher than the speed of reading from and writing to a conventional hard disk. Therefore, in-memory data across the network is preferred comparing to local on-disk data.

One key issue in the above approach is that with the rapid growth of data volume and data diversity, it becomes increasingly important to consider distribution of processing power across a wide-area of physical locations. This is based on the following observations:
1. With the prevalence of data harvesting devices, e.g. sensors, data become increasingly distributed at the point of generation. Instead of collecting data to a central location and redistributing data according to predefined characteristics, it becomes natural to observe the data locality according to the point of generation. Fragments of the data and/or processing units are then redistributed to optimise the performance.
2. A real bottleneck of a centralised (or sometimes referred to as backhaul data collection and analysing) approach in the current worldwide computer network is the transoceanic fibre network crossing (e.g. transatlantic and trans-pacific cables). The cost and geographical difficulties dictate that such transoceanic fibre connections are likely to be the critical path in the conventional approach.
3. Data become naturally fragmented and distributed due to the diversity of specialised collection device, e.g. sensors. The outcome is that data within the regime of one harvesting method become increasingly homogeneous while data from different regimes become increasingly diverse. Processing data locally at the point of collection (and adapting to the regional data) may increase overall system performance.
4. The centralising-redistributing approach does not work in cases when moving data across the borders of sovereign countries. Due to safety, privacy and security reasons, many countries impose laws that prevent data (in any forms) from crossing borders. This makes optimisation based on a global, centralised view impossible.

Meanwhile the network connecting such locations can vary significantly. Such information should be taken into account when optimising data and process locality.

2. Description of the Related Art

Invention embodiments aim to take some or all of these observations into account and facilitate efficient data analysis which is suitable for use with geographically distributed data sources.

According to an embodiment of a first aspect of the invention, there is provided a computer-implemented method computer-implemented method of executing a query in a network of data centres, the method comprising a preparation stage and an execution stage; wherein the preparation stage includes:

each data centre providing information relating to data centre parameters and/or proximity, allowing arrangement of the data centres in a dynamic hierarchical cluster topology of a parent data centre and child data centres, each child data centre having its own local data sequence which is to be processed by individual analysis tasks of the query, the child data centres together forming a cluster of similar and/or proximate data centres, the cluster having a single parent data centre;

and the execution stage includes:

the parent data centre sending the tasks to the child data centres and the child data centres sending to the parent data centre a sequence of outcomes derived from the local data sequence and the tasks; wherein both a child data centre and its parent data centre cache executed tasks executed by the child and the sequence of outcomes of the tasks executed by the child data centre.

This combination of feature allows a dynamic hierarchical cluster structure (which may for example change in accordance with data centre parameters such as data size, operators supported or typical tasks processed). This hierarchical clustering allows grouping of similar and/or mutually proximate data centres, such as those in the same country processing the same type of data.

In this embodiment, both a child data centre and its parent data centre cache (temporarily store) executed tasks executed by the child and the sequence of outcomes from the child data centre, for instance until a query is completed. Thus the parent stores all the tasks and outcomes from each of the child data centres in the cluster. This caching allows a certain flexibility of operation, effectively using the stored information as a back-up.

In one embodiment, in the execution stage, if the child data centre identifies any change in outcomes associated with new incoming data, the child data centre provides a transformation to reproduce the change from the outcomes cached and sends the transformation to the parent data centre. This is known as a "push-update". For example, new incoming data may be of a greater volume and it may be possible to reproduce the effect of this on the outcomes cached using a transformation (if not, this process does not take place) and use the outcomes cached at the parent and transformation to avoid sending data unnecessarily.

In another embodiment referred to a pull-estimation (which may be combined with the push-update), in the execution stage, if communication between the parent data centre and the child data centre is interrupted, the parent data centre can use outcomes from another of the child data centres in the same cluster to carry on with the sequence of outcomes.

The child data centre clusters may be formed based on data centre parameters including any of: data size, expected tasks and data centre allowable operations. The child date centre may be formed based on data centre proximity factors including any of: physical proximity, network connection and regional location. In many embodiments, both data centre parameters (which are more likely to change over time) and proximity factors may be included.

The preparation stage can include providing, for the data centres, uplink bandwidth of the child data centre towards the parent data centre, and downlink bandwidth from the parent data centre towards the child data centre and size of the child data centre. These can be useful in assessing many factors, including data relocation considerations.

SUMMARY

Additional aspects and/or advantages will be set forth in part in the description which follows and, in part, will be apparent from the description, or may be learned by practice of the invention.

Invention embodiments may provide data (and therefore also task) relocation under defined conditions, the relocation including transferring data from an original child data centre to a destination child data centre and carrying out a task at the destination child data centre.

The defined conditions can take into account the amount of time required to transport the data which is transferred.

In one example, the defined conditions are defined based on uplink bandwidth of the child data centre towards the parent data centre, downlink bandwidth from the parent data centre towards the child data centre and size of the child data centre. These and potentially other factors may be used to calculate a ratio of data moved to a child data centre to data moved from that child data centre during data relocation.

The network may comprise one cluster, or a number of clusters, some perhaps including a single child date centre. The query may be entered into the network of data centres at a root data centre which is the overall parent of the hierarchy; the root data centre sending the tasks via (an) intermediate parent data centre(s) if the hierarchy has more than one level to child data centres which are leaf data centres forming the lowest level of the hierarchy.

The method may further comprise using, for each child data centre in the cluster, uplink bandwidth of the data centre towards the parent data centre, and size of the data centre to determine selection of a subset θ of data centres for executing the analysis task, wherein the size of the subset θ is preset to be greater than a threshold and the selection is to minimise the potential uplink communication.

According to an embodiment of a further aspect there is provided a parent data centre in a network of data centres for executing a query, wherein the data centres are arranged in a dynamic hierarchical cluster topology of the parent data centre and child data centres, each child data centre having its own local data sequence which is to be processed by individual analysis tasks of the query, the child data centres together forming a cluster of similar and/or proximate data centres, the parent data centre being the only parent for the cluster;

the parent data centre comprising:

a processor and I/O configured to provide information relating to data centre parameters and/or proximity to other data centres, and further configured to receive the tasks, to send the tasks to the child data centres; and to receive from each child data centre a sequence of outcomes derived from the local data sequence and the tasks; and storage configured to cache executed tasks executed by the child and the sequence of outcomes of the tasks executed by the child data centre.

The processor and I/O may be configured to receive user queries and to form the hierarchical cluster topology. This configures the particular parent data centre as the rood data centre.

According to an embodiment of a still further aspect there is provided a child data centre in a network of data centres for executing a query, wherein the data centres are arranged in a dynamic hierarchical cluster topology of a parent data centre and child data centres, each child data centre having its own local data sequence which is to be processed by individual analysis tasks of the query, the child data centres together forming a cluster of similar and/or proximate data centres, the parent data centre being the only parent for the cluster;

the child data centre comprising:

a processor and I/O configured to provide information relating to data centre parameters and/or proximity to other data centres, and further configured to receive the tasks from the parent data centres and to send the parent data centre a sequence of outcomes derived from the local data sequence and the tasks; and storage configured to cache tasks that the child data centre has executed and the sequence of outcomes of the tasks that the child data centre has executed.

According to an embodiment of a yet further aspect there is provided a network of data centres for executing a query comprising a parent data centre as described above and a plurality of child data centres as described above. In this embodiment there may be provided network of data centres for executing a query, wherein the data centres are arranged in a dynamic hierarchical cluster topology of the parent data centre and child data centres, each child data centre having its own local data sequence which is to be processed by individual analysis tasks of the query, the child data centres together forming a cluster of similar and/or proximate data centres, the parent data centre being the only parent for the cluster;

the parent data centre comprising:

a processor and I/O configured to provide information relating to data centre parameters and/or proximity to other data centres, and further configured to receive the tasks, to send the tasks to the child data centres; and to receive from each child data centre a sequence of outcomes derived from the local data sequence and the tasks; and storage configured to cache executed tasks executed by the child and the sequence of outcomes of the tasks executed by the child data centre; and the child data centre comprising:

a processor and I/O configured to provide information relating to data centre parameters and/or proximity to other data centres, and further configured to receive the tasks from the parent data centres and to send the parent data centre a sequence of outcomes derived from the local data sequence and the tasks; and storage configured to cache tasks that the child data centre has executed and the sequence of outcomes of the tasks that the child data centre has executed.

An apparatus or computer program according to preferred embodiments of the present invention can comprise any combination of the method aspects. Methods or computer programs according to further embodiments can be described as computer-implemented in that they require processing and memory capability.

The apparatus according to preferred embodiments is described as configured or arranged to, or simply "to" carry out certain functions. This configuration or arrangement could be by use of hardware or middleware or any other suitable system. In preferred embodiments, the configuration or arrangement is by software.

Thus according to one aspect there is provided a program which, when loaded onto at least one data centre configures the data centre to become the parent or child data centre according to any of the preceding data centre definitions or any combination thereof. Indeed the same software can be loaded onto a data centre and provide the configuration as the parent or child data centre dynamically in accordance with the dynamic cluster formation.

According to a further aspect there is provided a program which when loaded onto a network of data centres configures the data centres to carry out the method steps according to any of the preceding method definitions or any combination thereof.

The invention can be implemented in digital electronic circuitry, or in computer hardware, firmware, software, or in combinations of them. The invention can be implemented as a computer program or computer program product, i.e., a computer program tangibly embodied in a non-transitory information carrier, e.g., in a machine-readable storage device, or in a propagated signal, for execution by, or to control the operation of, one or more hardware modules.

A computer program can be in the form of a stand-alone program, a computer program portion or more than one computer program and can be written in any form of programming language, including compiled or interpreted languages, and it can be deployed in any form, including as a stand-alone program or as a module, component, subroutine, or other unit suitable for use in a data processing environment. A computer program can be deployed to be executed on one module or on multiple modules at one site or distributed across multiple sites and interconnected by a communication network.

Method steps of the invention can be performed by one or more programmable processors executing a computer program to perform functions of the invention by operating on input data and generating output. Apparatus of the invention can be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The invention is described in terms of particular embodiments. Other embodiments are within the scope of the following claims. For example, the steps of the invention can be performed in a different order and still achieve desirable results. Multiple test script versions can be edited and invoked as a unit without using object-oriented programming technology; for example, the elements of a script object can be organized in a structured database or a file system, and the operations described as being performed by the script object can be performed by a test control program.

BRIEF DESCRIPTION OF THE DRAWINGS

Preferred features of the present invention will now be described, purely by way of example, with references to the accompanying drawings, in which.

DETAILED DESCRIPTION

Figure 1:
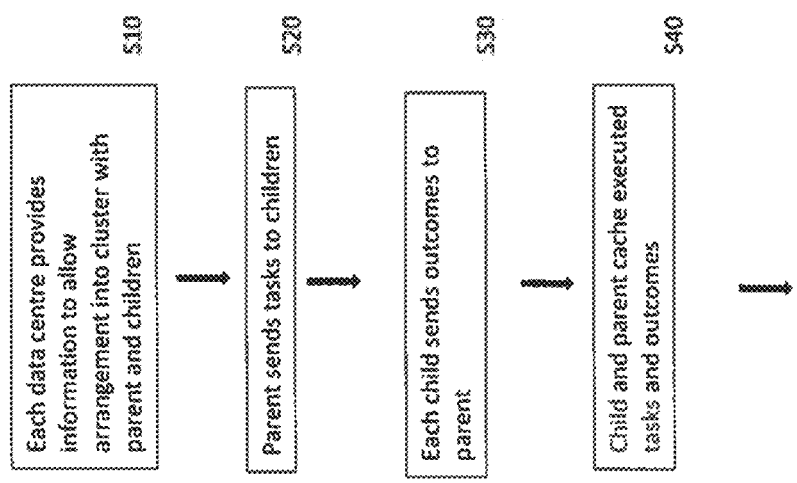
FIG. 1 is a flow chart of a method in a general embodiment.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a flowchart of a method of invention embodiments which may take place in a network of data centres and specifically in a cluster of that network.

In step S10 each data centre provides information (for example about itself and about its connections to other data centres) to allow arrangement into a cluster with parent and children. This information may all be provided, for example, to a single data centre (perhaps a root data centre as discussed further hereinafter) in a data centre network. It may be stored centrally or in a distributed fashion.

In step S20, the parent in the hierarchy sends tasks to the children. These can be individual tasks which together make up the query (or the part of the query assigned to the parent if there are multiple parents at the same level in a larger hierarchy).

In step S30, each child sends outcomes to the parent in its cluster. In step S40, each child caches its own executed tasks and outcomes and the parent caches all the executed tasks and outcomes in the cluster.

Figure 2:
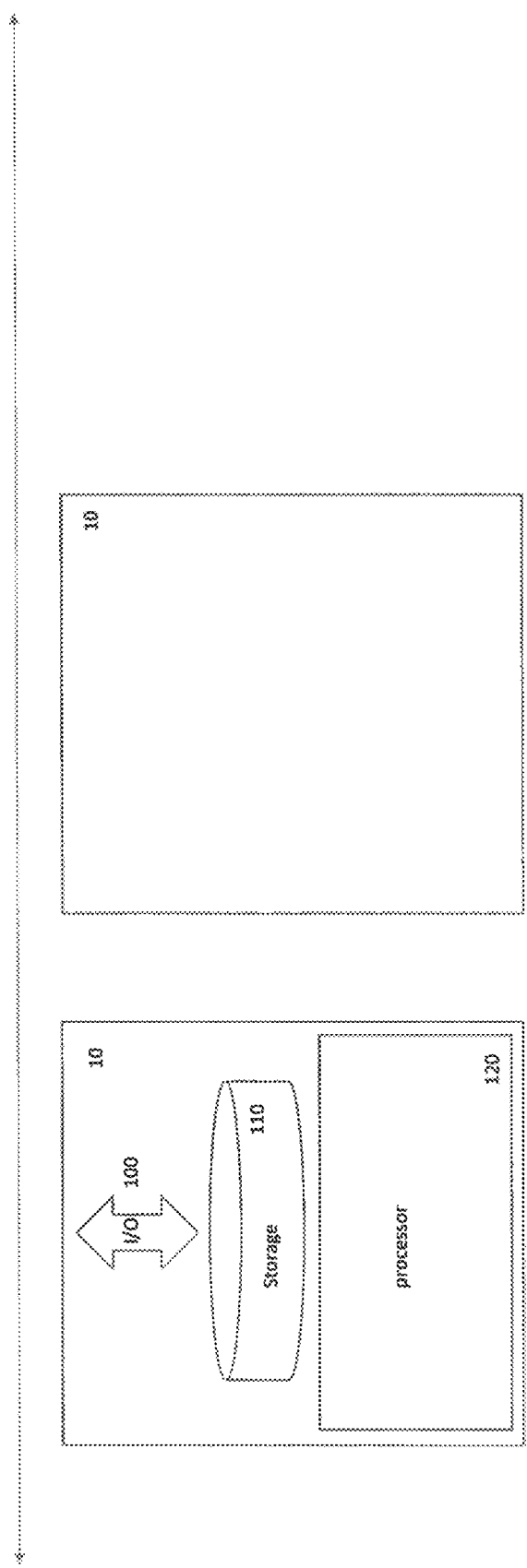
FIG. 2 is a block diagram of a parent or child data centre in a general embodiment of the invention.

FIG. 2 is an overview diagram of components of data centre which may be a parent data centre or a child data centre. Each data centre may in fact function as a parent and as a child, but at different times or for different queries. Only the parts used in invention embodiments are depicted. Each data centre includes I/O (an input/output component) 100, which is shown as a single unit, but may be split into sections, storage 110, processor 120 (which is mentioned in the singular but is likely to include a number of processing units functioning together as a processor).

Figure 4:
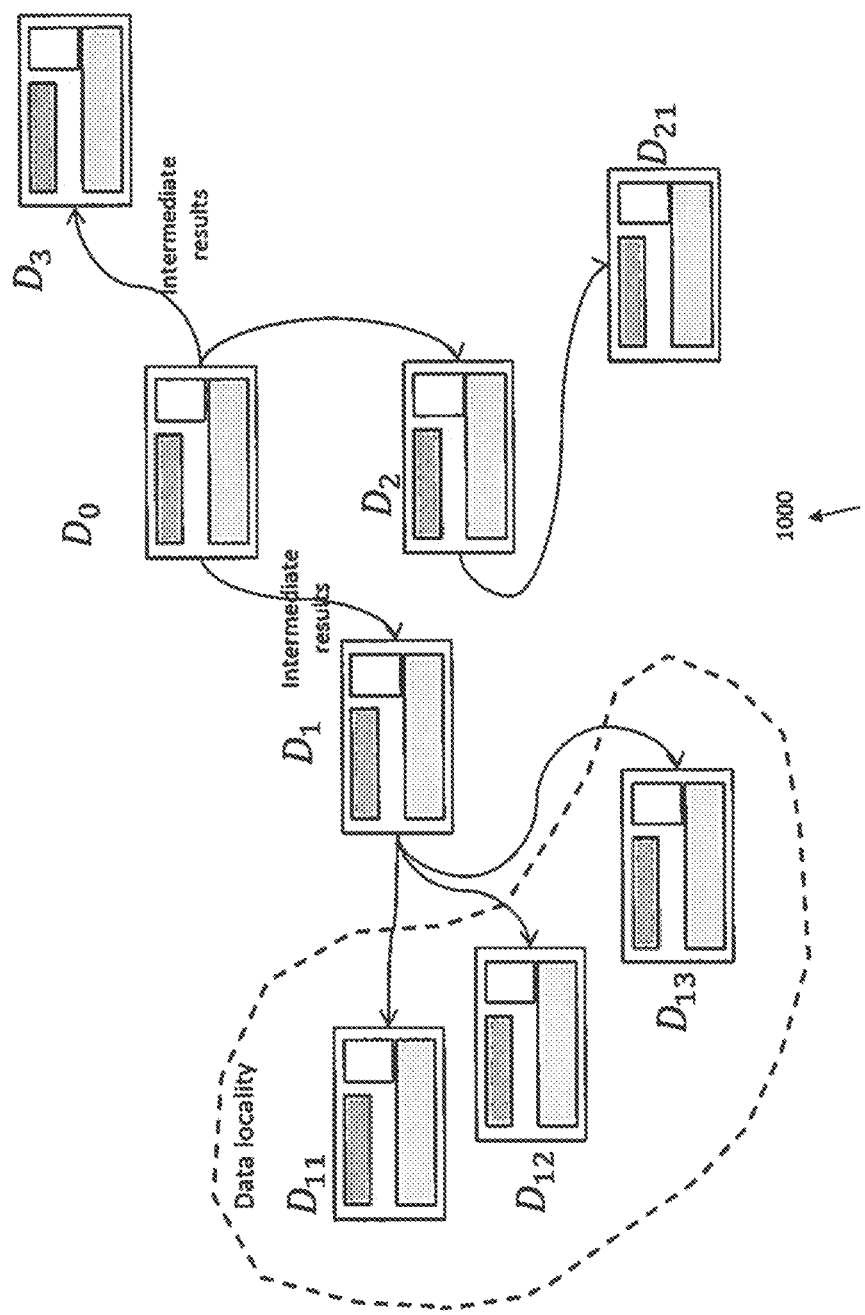
FIG. 4 is an example of a hierarchy of data centres.

The data centres are arranged in a dynamic hierarchical cluster topology of the parent data centre and child data centres which is only represented here by a connection arrow and an additional data centre outline. Each child data centre stores its own local data sequence (for example from local data sources) which is to be processed by individual analysis tasks of a query. The child data centres together form a cluster of similar and/or proximate data centres, the parent data centre being the only parent for the cluster. An example network and cluster is shown in FIG. 4.

The parent data centre 10 comprises:

a processor 120 and I/O 100 configured to provide information relating to data centre parameters and/or proximity to other data centres, and further configured to receive the tasks, to send the tasks to the child data centres; and to receive from each child data centre a sequence of outcomes derived from the local data sequence and the tasks; and storage 110 configured to cache executed tasks executed by the child and the sequence of outcomes of the tasks executed by the child data centre.

The child data centre 10 comprises:

a processor 120 and I/O 100 configured to provide information relating to data centre parameters and/or proximity to other data centres, and further configured to receive the tasks from the parent data centres and to send the parent data centre a sequence of outcomes derived from the local data sequence and the tasks; and storage 110 configured to cache tasks that the child data centre has executed and the sequence of outcomes of the tasks that the child data centre has executed.

Hereinafter, a data centre is denoted as $D_i$ which is assumed to have sufficient processor/CPU (central processing unit) power and storage space. This assumption is based on the fact that the price of CPUs (and processors in general) and storage devices is marginal comparing to the cost of constructing a major data centre. $D_i$'s computational and storage capacities can be easily expanded. Also intra-$D_i$ network connections (connections between the computers in a single data centre, and/or between the processors and memory in a single data centre) can be strictly regulated and carefully optimised. Latency of such communication can be ignored. Meanwhile, it is assumed that within each $D_i$, data and process locality issues are satisfactorily solved (using existing, off-the-shelf technologies from the distributed computing paradigm). This is also beyond the scope of this document. In the following, inter-$D_i$ planning and execution strategy is the focus.

SYMBOLS

In the following text, the following symbols are frequently used.

$D_i$: a data centre $s_i$: the data size of a data centre. This is typically stated as gigabytes, although other widely accepted units can be used and will not affect the final computation.

$r_{i,j}$: the data size reduction ratio after jth (category of) operator is applied to the data. This is normally stated as a percentage, hence without units.

$t_{i,j}$: the time elapse of executing jth (category of) operator on a unit size of local data. Depending on the types of computation, typical units can be seconds, or milliseconds. This is elapsed real time.

$T_{i,j}$: the accumulative total time elapse of executing jth (category of) operator on all local data $W_i^{ul}$: the uplink bandwidth of a data centre, with a typical unit of bits/second $W_i^{dl}$: the downlink bandwidth of a data centre, again with a typical unit bits/second Data Centre Though it is not explicitly required, data centres in this document are assumed to follow a 3-tier design with potentially higher software layers. The typical 3-tier design consists of core layer, aggregation layer, and access layer. The core layer is considered the main ingress and egress layers of a data centre.

Servers in a data centre are arranged in multiple racks with a rack switch to distribute access requests. Rack switches are connected to rack cluster switches which are in turn connected to high performance computing facilities composing the core layer as the edge of the datacentre. Uplink of each tier can be collected either as the hardware specification or by using periodically network testing facilities. Downlink with respect to a data centre is measured by using network testing facilities. Such information can be relayed to the virtual parent data centres and stored at the layer 3 or layer 4 parent data centre (software) load balancers, should available resource be allowed at such locations. Ideally at layer 4 (software) load balancer, information about child data centres can extend the original information to allow the formation of virtual hierarchies with some data requests being redirected to child data centres if necessary.

Figure 3:
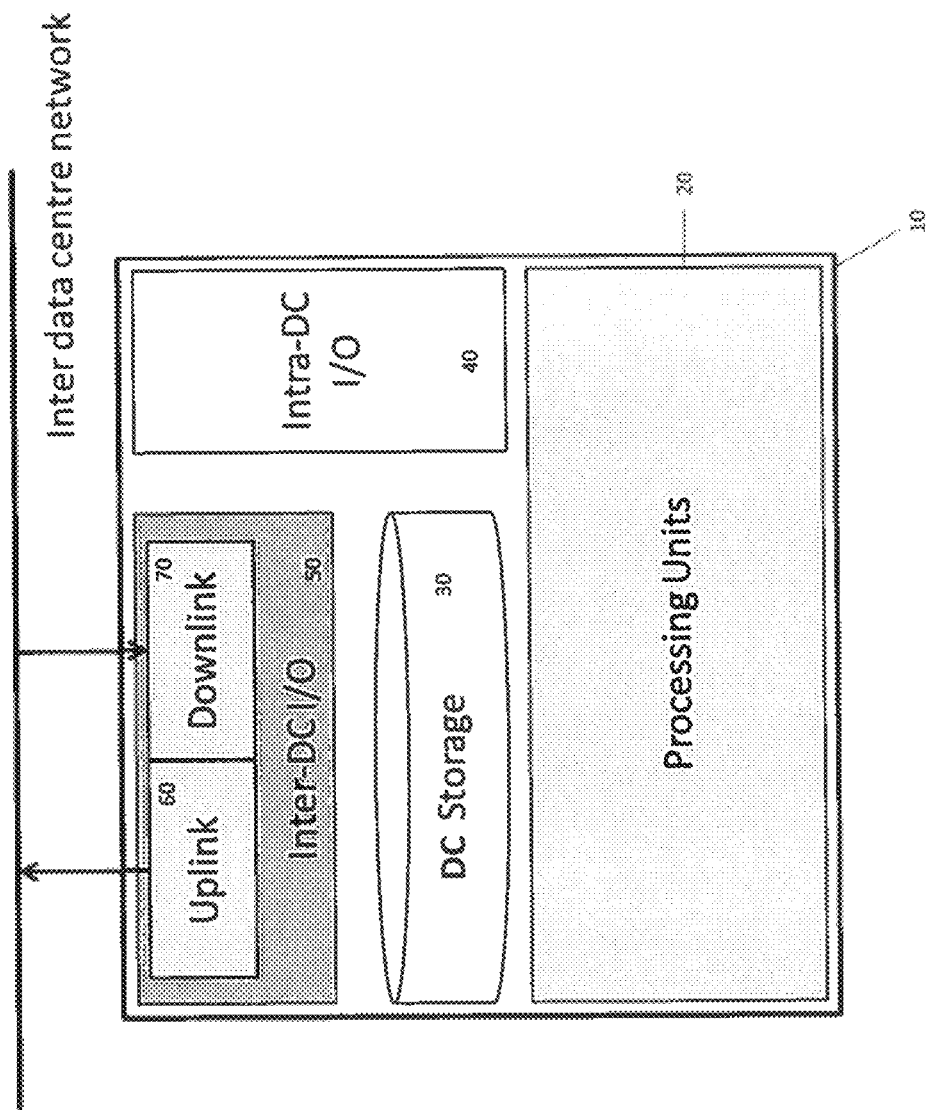
FIG. 3 is a more detailed diagram of a data centre for use in invention embodiments.

Typically, a data centre can be represented with the virtual architecture shown in FIG. 3, which is a block diagram of a data centre 10 which embodies the present invention, and which may be used to implement a method of an embodiment of the invention.

A data centre can be viewed as a virtual machine 10, with processing units 20 distributed across all the machines, transient and persistent data centre (DC) storage 30 provided by hard disks, network area storage, on chip or on board memories, etc. The virtual machine can differentiate Intra-DC I/O 40 and Inter-DC I/O 50 where the former should be considerably faster than the latter. The Inter-DC I/O should also differentiate uplink bandwidth 60 and downlink bandwidth 70 which in many cases are not equal. Intra-DC I/O 40 is not featured further in this document, but mentioned here for completeness.

An embodiment may be composed of a network of these data centres. Optionally, the data centre may also include one or more input mechanisms such as keyboard and mouse, and a display unit such as one or more monitors which are not shown. The components are connectable to one another via internal communication paths, also not shown.

The memory 30 may include a computer readable medium, which term may refer to a single medium or multiple media (e.g., a centralized or distributed database and/or associated caches and servers) configured to carry computer-executable instructions and/or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor block 20 is configured to control the computing device and execute processing operations, for example executing code stored in the memory to implement the various different functions described here and in the claims. The memory 30 stores data being read and written by the processor 20. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

A display unit may display a representation of data stored by the data centre and may also display a cursor and dialog boxes and screens enabling interaction between a user and the programs and data stored on the data centre. The input mechanisms may enable a user to input data and instructions to the computing device.

The interface 40 may be connected to a network, such as the Internet or a specialist network, and is connectable to other such data centres in the network. The interface 40 may control data input/output from/to other apparatus via the network. Other peripheral devices such as microphone, speakers, printer, power supply unit, fan, case, scanner, trackerball etc may be included in the computing device.

The data centre as used in invention embodiments may comprise processing instructions stored on a portion of the memory 110, the processor 120 to execute the processing instructions, and a portion of the memory 110 to store data, tasks and outcomes during the execution of the processing instructions.

Methods embodying the present invention may be carried out on a data centre such as that illustrated in FIG. 3 Such a computing device need not have every component illustrated in FIG. 3, and may be composed of a subset of those components.

A method embodying the present invention may be carried out by a plurality of data centres operating in cooperation with one another. Another method may take place in a single data centre.

Data Format

It is assumed that local data segments are often observed. Such segmentation can be based on format, syntax and semantics. Here, the segment is the natural separation of data when collected. For instance, clickstream (a series of mouse clicks made by a user, especially as monitored to assess a person's interests) collected from a region will be stored close to the point of generation and present a segmentation of data, which eventually will need to be combined with similar data from other regions to give the overall analysis. Also sensor data can be stored as they are collected (for example in the same format with the same syntax and semantics), on servers.

Meanwhile metadata are generated which faithfully reflect such local segmentations. For instance, for a meteorological sensor station, the metadata should contain both static and dynamic information. Static metadata include the data schema, data format (e.g. tabular format or unstructured text) and issuing organisation (and other key information for data provenance purposes), etc. The dynamic metadata include the rate of data generation, data size, data locality (local data location), etc. which tend to change over time due to data optimisation methods. Metadata also indicates that the sensor data are split based on dates and periods, for instance. This split can be a different dimension of segmentation that dices geographically segmented data potentially based on the time dimension for better operation.

Each data centre can also provide typical allowable operations (operators) that can be applied to the data held by the data centre. It is possible that a data centre holds a myriad of data. In this proposal, it is assumed that for each logically independent data block a list of categories of typical operators can be defined. A logically independent data block can be considered as data with a similarity of function or meaning, but different origins and/or further sliced with a second dimension, e.g. time. That is, logically independent blocks may be physically on the same machine but can be logically separated.

Operators can be aggregation or transfer ones. For data, typical transactions are data reduction transactions (such as aggregation) and size-preserving transactions (that covert data into a new form without changing the space complexity of data). Categories group similar operators together as an abstraction. The operator similarity can be based on the semantics of the operator: e.g. count type: such as counts, max, min, average, etc. and dimension-preserving type, such as rotation/distortion of image, matrix addition, etc. For each category j, the following characteristics can be estimated (or evaluated) for each data centre: $r_{i,j}$ the data size reduction ratio, $t_{i,j}$: the time elapse of executing jth (category of) operator, and the total time elapse $T_{i,j}$:

Here, $t_{i,j}$ is the time spent on a unit data block. This unit data block and time can be defined by users for computational convenience. For instance, it can be unified across the entire system to count sensor data collected from one sensor during one hour (in kilobytes) as the basic unit or data from all the homogeneous sensors (data sources) during one day (in gigabytes) as the basic unit. How to define the basic unit data block can be decided by the users as long as they are unified across the entire setup. $T_{i,j}$ is the accumulation of an operation j on all data of the same kind (homogeneous data blocks subject to the same transactions/operations.

Processing

In general, the proposed solution consists of two functional stages:
 1. Preparation stage: essential network and task related characteristics are collected and estimated at this stage.
 2. Execution stage: parameters derived from the preparation stage are used to dictate the execution of an arbitrary analysis task.

FIG. 4 is a logical abstraction of the framework basis for the preparation stage. In this illustration, data centres are divided into a hierarchy. The figure shows a root data centre $D_0$, with direct links to some data centres (these are $D_1$ $D_2$, and $D_3$). $D_o$ can be seen as a parent data centre to these three data centres. In turn, these can be parent data centres for further data centres. For example, $D_1$ has three child data centres, $D_{11}$, $D_{12}$, and $D_{13}$, which are sibling data centres forming a cluster. $D_2$ has a single child data centre, $D_{21}$.

The idea is that the virtual hierarchy can have multiple layers (although it is normally not deep). All the nodes in the hierarchy should be able to process data locally (if they hold part of the data to answer the query). However, only the non-leaf node in the hierarchy needs to cache the intermediate results and implement (as the parent) the push/pull optimisations described in more detail hereinafter.

The data centres $D_i$ share the same logical architecture (represented by the blocks within the data centres which correspond to the structure of FIG. 3), although their physical implementation may be different. Among all the data centres, $D_0$ refers to the one where the user queries arrive. This could be based on physical proximity of users and a data centre or based on explicit query submission defined by the user. Only one data centre will assume the role of receiving user queries. When a user submits a query through their UI (user interface) device, e.g. a personal computer or a laptop or a mobile or even directly at a data centre, the query is relayed to one data centre which is considered as $D_0$ in this diagram. Answers to that query will be sent back to users via $D_0$. So $D_0$ is the main entry point of user interaction.

$D_0$ can change based on different queries. Often the queries are data intensive queries which are expected to run for a sustained period of time. The needs of repetitive execution and long execution duration justify the overhead of creating the virtual hierarchical structure.

All the data centres involved in this framework are arranged in a dynamic cluster structure, which groups together data centres in a way that is advantageous. This may allow certain tasks to be allocated to a cluster of data centres that are linked together by one or more similarities in terms of location, or by good connectivity or even by similar capacity/architecture. For example, cluster topology can be defined based at least partially on the following proximity factors (but also perhaps to take into account data centre parameters such as homogeneity of data stored in the data centres, and data centre operations):

1. Physical proximity: how far two data centres are from each other
2. Network connection among data centres and between any data centres and
3. geographic features: whether several data centres are located in the same sovereignty The skilled reader will know how to compute and construct the hierarchical structure and this is therefore not covered further in this document.

These cluster hierarchies are different data centres grouped into clusters and then arranged into several (maybe two or three—a large depth is not expected] layers of hierarchical structure. The advantage of this is two-fold:

1. Homogeneous data centres can be grouped together in this logic topology. This grouping can be based on geographic proximity, data homogeneity, task homogeneity, etc. The ideal outcome is that children of a parent data centre $D_p$ shall share similar data structures (in the context of handling a set of particular queries) and should respond largely similarly for a common set of tasks, even though they may hold different data and present different query responding characteristics. For instance, when analysing click stream of certain website (at a global scale), data centres holding such stream data can be grouped based on their geographic locations. An aggregation task can be executed locally whose results are aggregated through several layers in the hierarchical structure.
2. A parent data centre can manage its children. Due to similarity of data and geographic characteristics, data in the children centres are subject to the same safety and privacy regulations and thus data can be relocated for better system performance. Also, parent data centre has more visibility of the status of its children. It can estimate the availability and compensate when children are unavailable.

Benefit: A logical structure is imposed on the data centre network. This can help to better manage the communication and data allocation.

Preparation Stage

Invention embodiments can include the following steps in the preparation stage, in accordance with the requirements of the process:

1. Each $D_i$ estimates (or simply accesses if already known) metadata and parameters defined in the previous section. These include, for example, data size, $s_i$, $r_{i,j}$: the data size reduction ratio after jth (category of) operator is applied to the data so that data can be estimated at a future time point, and operations that can be applied to the data currently held and operations characteristics, $t_{i,j}$, $T_{i,j}$ (time spent on a unit data block for one operator and time spent on all the data in the data centre for that operator).
2. The cluster hierarchy is defined (e.g. as described above and presented in FIG. 4). The hierarchy may be first created according to proximity and then be adjusted for data and/or query characterisation, for example to check what queries can be executed for a majority of data held locally in a cluster of data centres.
3. After this logical topology is defined, each data centre ($D_i$ and $D_0$) can periodically "poke" the network to estimate and predict network performance, for example if no query arrives. This process assumes a given computation task which is assumed to consume data from all data centres $D_i$.
   a. An exemplary fragment of data is generated (or sampled where appropriate) to reflect the data typically held at $D_i$. Ideally this should be the same size, as n-fold of a unit block (where n is an integer). So one can gauge the entire network performance using this representative dataset for comparison.
   b. $D_i$ periodically sends such exemplary data to $D_0$ together with its time stamp
   c. $D_0$ receives the data and estimates the uplink bandwidth of $D_i(W_i^{ul})$.
   d. $D_0$ periodically broadcasts a test (handshaking) data segment to all $D_i$ for estimating the downlink bandwidth of $D_i(W_i^{dl})$.
   e. Where hierarchical structure presents, the uplink and downlink bandwidth should be estimated for each pair of parent-child data centres.

The preparation stage is not necessarily continuous. Each $D_i$ produces data and forwards it along the hierarchy to its parent, the one in charge of task re-allocation/re-distribution. It can be performed whenever the entire framework has spare capacities (e.g. dynamically in an interval between two queries).

4. Data locality in-cluster adjustment is a process described below that may be performed between queries. It makes use of the uplink and downlink bandwidth estimation described above.

Data locality in-cluster adjustment is among all the children of $D_p$, a strict data locality regulation is not applicable. For instance, all the children may actually be located in the same sovereignty region (so that transfer of data between the data centres does not cross any borders). It is therefore possible to transport and/or duplicate data across leaf children data centres of $D_p$ for performance tuning. Such optimisation is likely to be only carried out at the leaf level. This data is for processing, so it is possible to execute a task on one data centre using data originally stored at another data centre. Such functionality supplies the invention embodiments with data relocation for better process efficiency.

This kind of optimisation can be based on $r_{i,j}$, $t_{i,j}$, $W_i^{ul}$, $W_i^{dl}$, $\alpha_i$ for the size of data to be downloaded (i.e. moved from another data centre] for processing locally (that is, at a certain data centre) and $\beta_i$ for the size of data to be processed remotely. Also define $s_i$ as the size of local data (as before). The target is to:

$$\min_{\alpha,\beta} \sum_i \left( \sum_j \left( \frac{r_{i,j} \cdot (s_i - \beta_i + \alpha_i)}{W_i^{ul}} + \frac{\alpha_i}{W_i^{dl}} \right) + \sum_j t_{i,j} \cdot (s_i - \beta_i + \alpha_i) \right)$$

essentially, this equation operates as follows In the first part, $$\frac{\alpha_i}{W_i^{dl}}$$

gives how long extra data need to be downloaded to $D_i$, and $$\frac{r_{i,j} \cdot (s_i - \beta_i + \alpha_i)}{W_i^{ul}}$$

gives that after downloading data from others and uploading data to others, and after some data operation ($r_{i,j}$), how long the results should be uploaded; together these two expressions tell how long it takes the data to be transported to and from $D_i$.

The second part is how long it takes to operate on the data. Together the two parts are to compute the time consumption of relocating the operation of some data to a different data centre. This will then be minimised across all the children to find the most optimised data transportation schedule, so that the whole network consumes the least amount of time for a query.

The minimisation target is the total time involved in processing the query at the immediate parent data centres of the leaf data centres. The total time is broken down as above to factor in the time for uploading and downloading data when cross data centre communication is necessary and the time for processing the queries locally at the data centre. The optimisation terminates when the best $\alpha_i$ and $\beta_i$ ratio can be found. Such an optimisation process can be time-consuming. At the start of the process, one can assume that all data should be handled at the local data centre without relocation.

The above target can be simplified as based on three assumptions:
1. Data locality is against all the children data centres evenly, $\alpha_i$ and $\beta_i$ are effectively equivalent.
2. Comparing to network communication time, local processing time can be largely ignored.
3. Operators are independent, i.e. operator j and k will not depend on one another.

This produces the simplified equation below:

$$\min_{\alpha} M \cdot \left( \frac{\bar{r} \cdot (s_i - \alpha/N) + \alpha}{W_i^{ul}} + \frac{\alpha}{W_i^{dl}} \right)$$

where $\bar{r}$, M and N are constants: $\bar{r}$ is the average data reduction ratio, N the number of children, M the number of operators to be applied on data held by a data centre. The above optimisation target can be easily solved to estimate the data to be reallocated or replicated in other data centres belonging to the same parent group.

Note that cross cluster data and/or process locality normalisation is not supported for non-child leaves in the case with the assumption that such locality transactions can risk data safety and sovereignty regulations, where only the (intermediate) processing outcomes can be transported.

The scope of this data locality tuning is illustrated in FIG. 4, in which a cluster of leaf data centres is circled. Moving upwards, intermediate results are aggregated at parent data centres. Note, that this is not a permanent physical hierarchical arrangement. Rather, the hierarchical structure changes based on the characteristics of data to be processed and/or the queries which are received.

Benefit: data locality tuning can improve task performance. Restricting the data locality tuning to be within each cluster (among sibling data centres) allows the observation of high level data security, privacy, and sovereignty rules. This offers a balance between performance and safety.

Execution Stage

At the execution stage, based on the logic/virtual hierarchical structure, the root data centre plays the role of receiving user queries, distributing queries down the hierarchy, aggregating the overall results, and delivering back to the users.

Data for processing are stored at leaf data centres (the lowest level of the hierarchy). The root data centre ($D_0$) is only responsible for task relocation. The root data centre is normally selected based on a balance between the proximity between end users and location where majority of data reside. Since the query and the intermediate data for final aggregation are normally small in size, a straightforward approach is to locate the root data centre in a region where the majority of data (for the query/application) are located.

Execution may comprise advantageous features such as:
Subset selection
Push-update
Pull-estimation Subset Selection For the selection of further data centres for a given query (if required), the following strategy may be applied: where C is the set of all children of a parent data centre (the root data centre is taken as the overall parent here because it forms the root of the hierarchy) $\sigma_i$ constant coefficients that can be used to adjust the selection strategy, and $\gamma$ a constant to avoid zero denominators, $$\min_{\theta \in 2^C \wedge |\theta| > \tau} \left( \sum_{i \in \theta} \left( \sigma_i \cdot \frac{s_i}{W_i^{ul} + \gamma} \right) \right)$$

Basically, the selection finds a subset $\theta$ among all the child data centres that can minimise the potential uplink communication between the children and the parent. In order to simply the target function, one can set $\sigma_i=1$ a and $\gamma$ to a sufficiently small number. Also, the size of $\theta$ should be greater than a threshold (either predefined by the users or set as a percentage of the entire population of children). This size of subset $\theta$ is greater than a threshold because it should be the same as or greater than a minimum value that enables the execution of a task. $\theta \in 2^C$ simply requires $\theta$ to be a subset of C.

At this stage, the method tries to find the subset of data centres based on their listed characters. The above is the simplest implementation only considering data size and uplink.

In terms of tasks/query allocation among the subset, all the data centres present as children of a parent data centre are pre-registered with the parent as those that potentially holding data necessary to complete a task at the parent. The task allocation resembles a map-reduce task (which splits an input into independent chunks for processing (mapping) in a parallel way and then provides a summary) in the sense that tasks/processes can be sent to the child C based on the assumption that characteristics of data on child DC are already known and can be/should be used when processing a task.

This subset selection step is not always necessary. It is included here, for example, to cater for cases in which there are not enough resources to process the task at all the child data centres. A subset of the data centres can be selected based on a minimum requirement set by the users or a minimum number of data centres the user deem to be sufficient for an analysis task. For instance, if one wants to analyse click stream of a region, in cases when only limited time is available, one instructs the system to only analyse 80% of the entire data sets (presumably roughly evenly distributed across data centres—data distribution can be rebalanced when at the interim time between two queries as explained above). The above target function is a simple implementation of centre selection. If it is a hard constraint that all data should participate in the analysis, the above subset selection step is then not necessary.

Push-update In this process, viewed from a parent centre ($D_p$) perspective, the data are pushed to it without an explicit request, hence the name. In the above logic topology, after the execution of initial analytics tasks (and thus part of the way through the allocated task) both $D_i$ and its parent data centre $D_p$ will cache the executed tasks/operators as well as the outcomes ($o_{ij}^t$) of executing such tasks, assuming the initial communication can be successfully established.

The analysis may be obtained on some parts of the local data on $D_i$. $D_i$ monitors its own data. This data changes. This data (from which the outcomes are generated) can be viewed as one set of vertices in an m-n bipartite graph between data sets and analysis results, in the sense that there are no connections between data and no connections among analysis results. When data changes, the corresponding results will be flagged. $D_i$ will:
1. Test whether the changes affect outcomes of the analytics tasks. (Normally non-size-preserving or projection tasks will be affected by data changes, for instance, as explained in FIG. 5, which illustrates a bi-partite graph.) Some data changes do not affect the results. These will be operations in which the outputs share the same data semantics as inputs, for instance, a data format change or data projection.
2. If so, redo the analytics tasks to see whether the outcomes are changed (as $o_{ij}^{t+1}$)
3. If so, identify the changes from the previous outcomes ($\Delta = o_{ij}^{t+1} - o_{ij}^t$)
4. Generate transformation plans $p_j(\Delta)$ that can reproduce $\Delta$ at $D_p$ using locally cached analytics outcomes at $D_p$.

Figure 5:
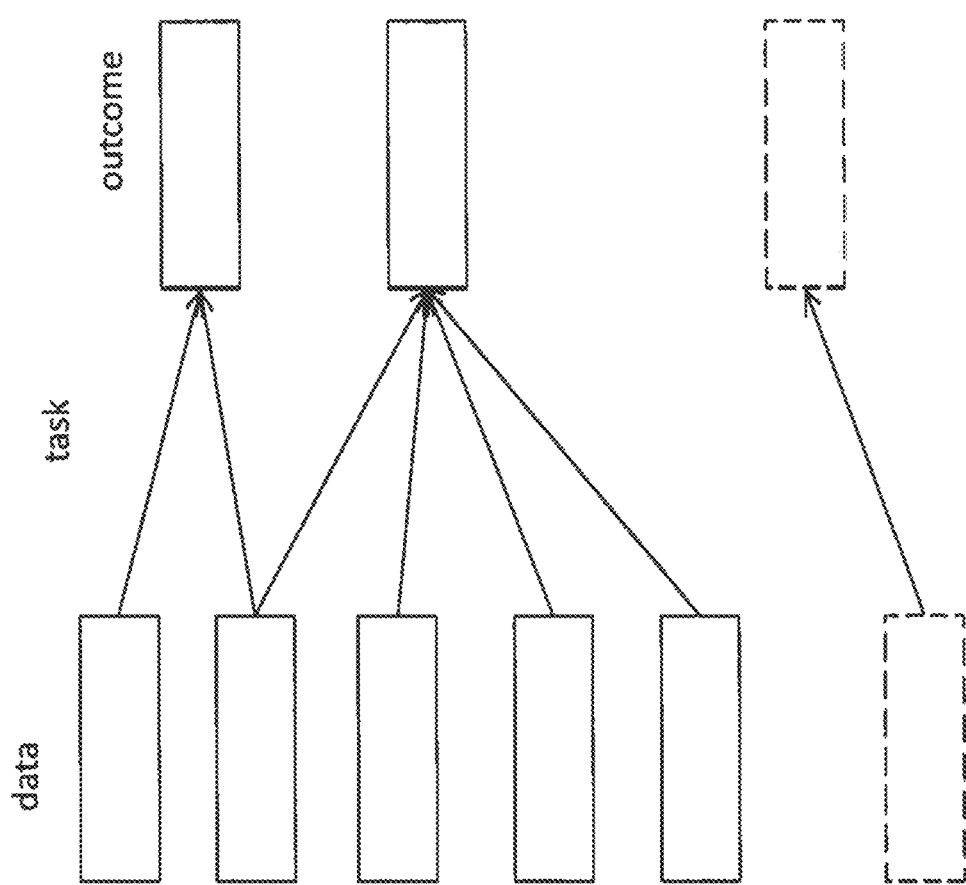
FIG. 5 is an overview of the effect of a task on data.

FIG. 5 shows a mapping of data to outcomes and shows that, for size-preserving transactions, changes can be isolated and an extra projection can be created (as the dotted transformation). For non-size-preserving transactions, it may be necessary to redo the analysis. This can provide a clue for the decision in the above first bullet point.

Benefit: By doing so, network traffic can be greatly reduced. Even when $D_i$ is not available for certain queries, local cached copies at $D_p$ can be used instead in further queries. The assumption is that the parent does not know what and how data have been changed, so this process takes place at the local data centre.

For instance, when the child realises data have changed (e.g. with increased data size, more items), it will first isolate the data that are changed and try to compute how the changed results can be derived from previous analysis results. For instance, the operation average(i_0, ... i_100) can contribute to average(i_0, ... , i_110)=(average (i_0, ... , i_100)*100+average(i_101, ... , i_110)*10)/110. The right hand side is a transformation plan that is independent from data and can be transported alone to be recreated at parent server. Such kinds of transformation plan can be either pre-defined or composed based on heuristic rules or by a human data engineer at the child data centre. The composition of transformation plan is not detailed further in this document.

Pull-estimation (again from the parent's perspective, this is actively requesting data from children): when $D_p$ is performing updates (processing results) based on the pushed updates from its children, it performs the updates based on the first come first serve strategy. When updates from $D_i$ have been committed, $D_p$ performs data transformation allocated at its level (using visibility of tasks and data of its children) and relays the results to its parent (if there is one).

Due to potential network malfunction, communication between $D_p$ and its children $D_i$ can vary. An interruption can be caused when either the connection is broken or the data centre is down. A time-out threshold is pre-configured. If the communication between $D_p$ and its children $D_i$ is interrupted for a time lapse greater than the threshold, $D_p$ terminates its communication and processes its' locally cached $o_{i,j}^t$ using incomplete transformation plan $\hat{p}_j(\Delta)$, which is a partial transformation plan or an estimated one by the parent. The time threshold value can be learned from historical communication patterns between $D_i$ and $D_p$ or set proportional to the completion of updates from other children data centres.

It is clear that the actual $p_{i,j}(\Delta)$ (the actual transformation plan that $D_i$ proposes to the parent to execute) cannot be obtained in this case. $D_p$ derives an approximation $\hat{p}_{i,j}(\Delta)$ based on information received from other children regarding their updates. A major assumption here is that all the children of $D_p$ shall share similar data structure and data update frequencies (at a given update episode) with respect to a query/application. The assumption is based on the data centres processing the same type of data. Thus the hierarchy is arranged so that children should have homogeneous data and perform largely similar data processes. When a majority of children have submitted their updates, $D_p$ can estimate essentially the updates from by finding the most similar $\hat{p}_{i,j}(\Delta)$ based on the partial knowledge of $p_{i,j}(\Delta)$ and operation instructions from other child data centres. This estimation can be done as follows:

$$\hat{p}_{i,j}(\Delta) = \Pi_{i,j}(\Delta) \| p_{k \neq i,j}(\Delta) s.t. \max(p_{k,j}(\Delta) \approx \Pi_{i,j}(\Delta))$$

where $\Pi_{i,j}(\Delta)$ is the partial update operation received from $D_i$, $\|$ concatenates or merge two update operations together, and $p_{k \neq i,j}(\Delta)$ s.t.max$(p_{k,j}(\Delta) \approx \Pi_{i,j}(\Delta))$ select the most similar complete update operation matching the partial one received from $D_i$ (s.t.max stands for "so that max( . . . )").

In practice, for simplicity, one can assume that at a given update episode, all children perform largely similar update operations and complete updates received from other children can be applied to cached data to complete the partial ones.

Figure 6:
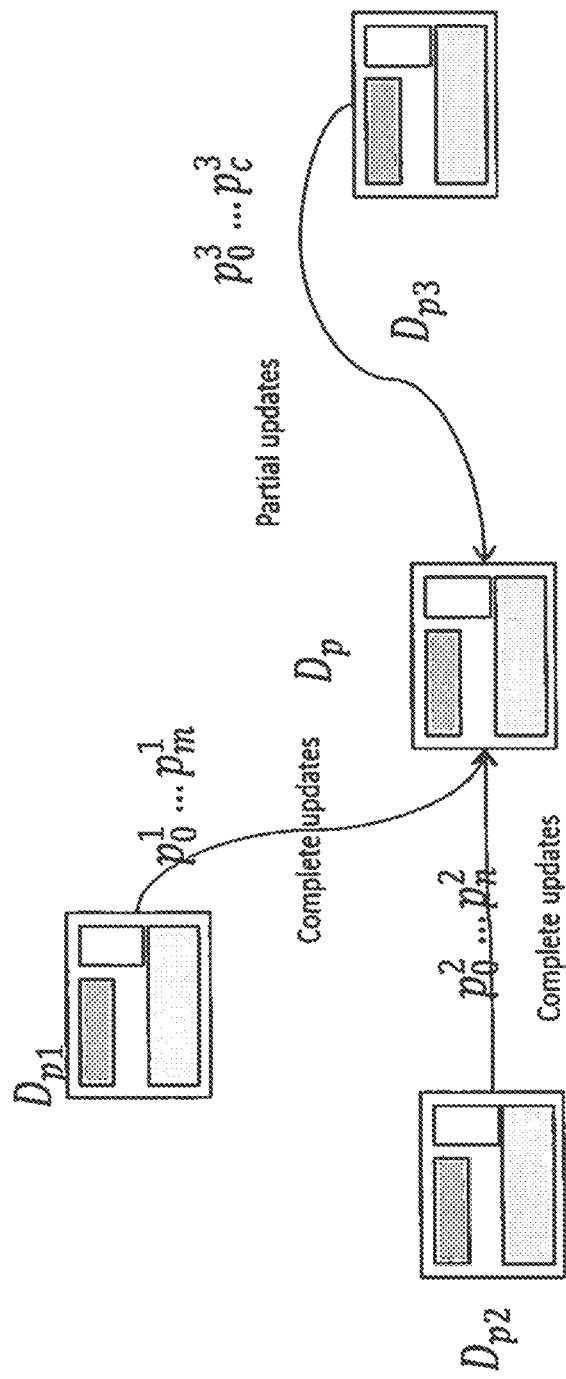
FIG. 6 is an example of pull-estimation.

FIG. 6 illustrates the update idea. $D_{p1}$ and $D_{p2}$ complete their update while $D_{p3}$ fails to do so. $D_p$ only receives partial update from $D_{p3}$, $p_0^3$ ... $p_a^3$. Assume $D_{p1}$ is deemed to provide the most similar updates using the information received already in this case, $\hat{p}(\Delta)$ is computed by combining two updates together as $\hat{p}(\Delta) = p_0^3 \ldots p_a^3, p_{a+1}^1, \ldots, p_m^1$. This is essentially carrying on the incomplete sequence using values from another child data centre.

Of course any further analytics based on such assumption is not accurate. The purpose of continuing the sequence using results from another data centre is to trade absolute accuracy with data safety and process efficiency, as the completely accurate results may never be obtainable. The principle of "eventual consistency" is adopted here: $D_p$ will continue pulling updates from $D_i$ while at this same time assuming updates based on $\hat{p}_j(\Delta)$ are correct. Computation logs are preserved until a response from $D_i$ is received. $D_p$ can then decide whether to trace back (repeat) the computation made during the time window when $D_i$ was not available.

Benefit: by doing this, the entire system can run (in an effective eventual consistent way) when certain child data centres are not available. The hierarchical structure is essential in this case to ensure that all the sibling data centres can behave largely similarly to be able to act as a reference against each other.

Overall Benefit

Some benefits of invention embodiments can be seen as follows:
1. A logical organisation of data centres to group similar or proximal centres together for better data locality and query handling
2. A local caching approach that facilitates "off-line" data processing, update-only communication, and reconstruction of updates when necessary
3. An in-cluster data locality scheme that improve the performance across data centres using data re-location and replication
4. A strategy to select which data centre should be used so as to avoid bottlenecks, in the form of selection of a subset of child data centres
5. A mechanism to gauge data centre performance that can help to constantly maintain a performance profile of all the data centres involved in query handling or a particular application. This relates primarily to downlink and uplink capacity.

Figure 7:
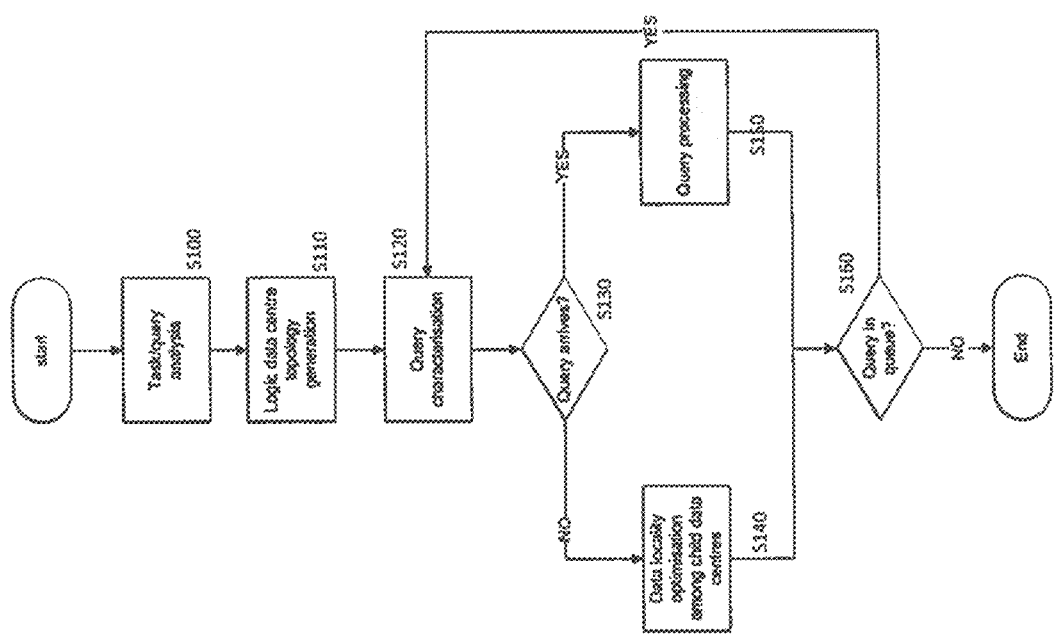
FIG. 7 is a flowchart of preparation and execution according to an invention embodiment.

FIG. 7 is a flow chart of an overall process according to one invention embodiment, including preparation and execution.

In general the whole process starts with initial task and/or query analysis, S110

This can be analysis based on expected tasks (based on application logic and potentially historical information about queries to be processed). This characterisation (along with proximity, which is however a constant can be used to guide logical data centre cluster generation in S110. That is, it imposes a virtual hierarchical structure over all data centres to be involved, also taking into account the characteristics of data centres.

In order to optimise, we require certain knowledge of what can be performed on the data (or what kind of analysis can be done on the data and/or what are the likely outcomes). This is considered the set of "admissible operations". For instance, typically for temperature sensors, we can expect operations such as sum, periodical average, min, max, etc.

The intention in query characterisation (S120) is to establish what queries can be executed for a majority of data held locally in a group of data centres. This is to help the re-organisation of how the virtual multiple data centre hierarchy should be established.

Once the logical structure is defined, the system estimates whether in-cluster data locality tuning is necessary and possible according to whether a query has arrived in S130: if queries have not arrived, data locality tuning can be conducted (S140); otherwise the system proceeds to query processing (S150).

Figure 8:
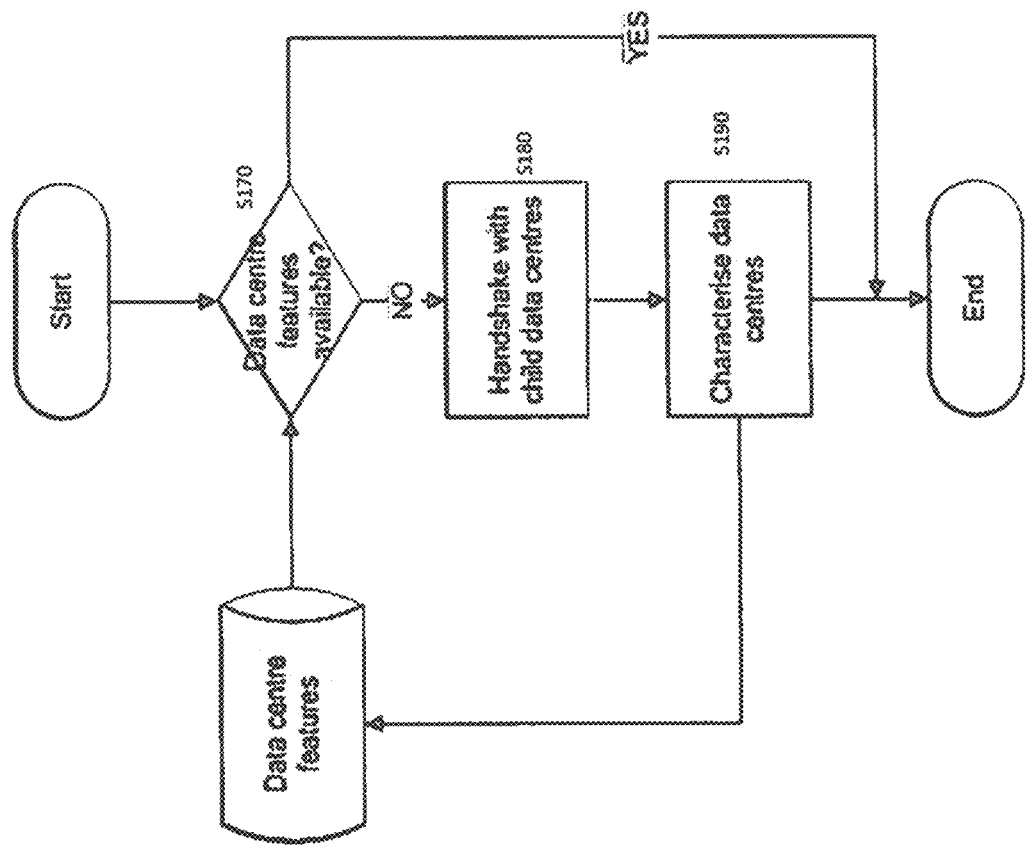
FIG. 8 is a flowchart of data centre characterisation.

FIG. 8 outlines continuous characterisation of data centres, by for instance parents or root data centres. Results of such characterisation are stored in a persistent storage.

Here, data locality tuning, S140, (as described in the cluster locality section) is based on both data centre and data features in the context of a particular application/processing task. The data features are: $s_i$, t, T, r. The data centre features can relate to uplink and downlink parameters. The system first queries a persistent storage in step S170 to see if these data centre features are already available (and potentially to check if available data centre features are out of date). The persistent storage is a shared (distributed data store, e.g. distributed hash table) or centralised data store. If not available, a handshaking message will be sent S180 to probe the connection with child data centre for uplink and downlink performance. Further information will follow to understand typical operators, their data reduction rate and their performance. These are the parameters mentioned in previous sections: r, t, and T.

Figure 9:
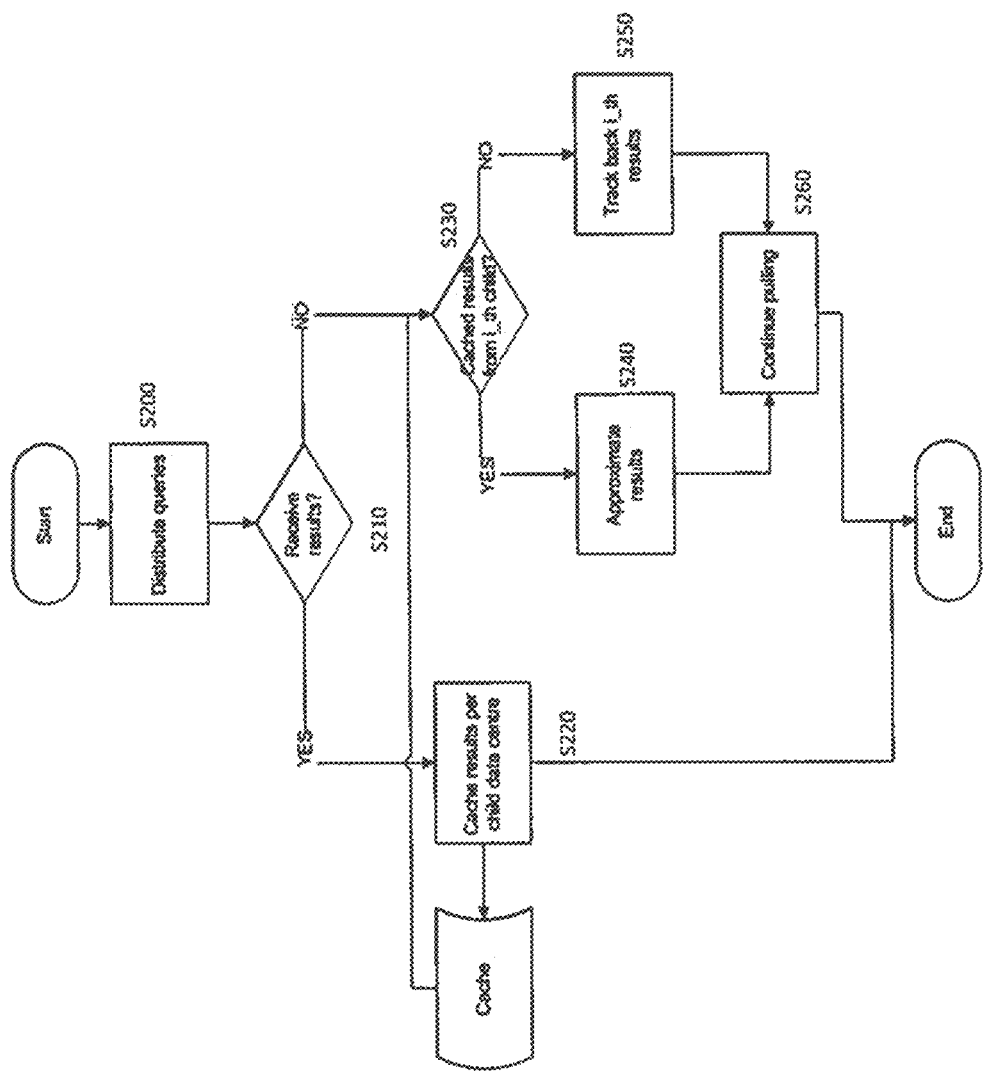
FIG. 9 is a flowchart of query distribution and execution.

FIG. 9 shows query execution.

A query is executed as follows:

S200. The query is distributed potentially taking into account the uplink and downlink of each child data centre to select a subset of the leaf data centres. This subset selection is when not all children are used. It is not relevant when all children have to participate.

S210: there is a query if complete results have been received

S220. If complete results are received from child data centres, they are cached both at the child and the parent data centres. The system proceeds to the next query.

S230. In the case that the complete results (outcomes) are not received:

S240. If there are cached outcomes and a cached task from the previous execution, the process approximates the results using either the push-update explained earlier or the pull-estimation or both.

S250. If there are not cached outcomes and a cached task, track back any intermediate results based on this child. That is, if there is no way of approximating results from $D_i$ even based on those from other children, $D_i$ is deemed permanently dead and should be removed from future processing.

S260. For either case, continue pulling till
i. Either a threshold is reached and the child can be presumed permanently not available
ii. Or results arrive and processing continues.

The query processing ends when there are no more queries.

According to invention embodiments, a method, a network including clusters, parent and child data centres and a computer program facilitate efficient data analysis across geographically distributed data sources. A comprehensive measure can be used to gather and estimate/predict the performance of analytics to be carried out on a dataset. That is, performance of admissible operations/analysis tasks is estimated based on the characteristics of data communication network between data centres and processing performance.

Invention embodiments can:
1. Store data at the edge (where the data are generated). Here, the term 'edge' means the entry point where the data is entering the system/network, so data need not be transported for storage, instead, they should be stored at their origins
2. Estimate the cost of executing an analytics task at a different data centre from where the data is produced and across different geographic regions (where different clusters are located). This is a reason the locality is only adjusted within one "parent-children" sub-tree which are organised within one jurisdiction or geographic region.
3. Plan a best strategy for executing the analytics task. This refers to the optimisation based on uplink and downlink to adjust data and decide where the aggregation (task) should be carried out.
4. Transport and/or update the results to facilitate the most efficient task execution, as explained i the push-update and pull-estimation sections.

Key features of invention embodiments can include:
1. Dynamism of the processes in invention embodiments: the estimation of system performance is continuously updated to reflect the most up-to-date changes. This feature refers to the continuous monitoring and estimating of uplink and downlink of all involved datacentres and/or continuous estimation of data operations (as part of processes satisfying a query) effect on data.
2. Incremental: the data analysis is performed incrementally to minimise the resource requirement Data safety: the proposed solution can observe regulatory and safety constraints.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A computer-implemented method of executing a query in a network of data centres, the method comprising a preparation stage and an execution stage; wherein
the preparation stage includes:
arranging the data centres in a dynamic hierarchical cluster topology of a parent data centre and child data centres, based on information relating to data centre parameters and/or proximity provided by each data centre, each child data centre having its own local data sequence which is to be processed by individual analysis tasks of the query, the child data centres together forming a cluster of similar and/or proximate data centres, the cluster having a single parent data centre; and
the execution stage includes:
the single parent data centre sending the tasks to the child data centres in the cluster and the child data centres in the cluster sending to the single parent data centre a sequence of outcomes derived from the local data sequence and the tasks;
wherein the child data centres in the cluster and the single parent data centre cache executed tasks executed by the child data centres in the cluster and the sequence of outcomes of the tasks executed by the child data centres in the cluster until the query is completed.

2. The method according to claim 1, wherein
in the execution stage, if a child data centre among the child data centres in the cluster identifies any change in outcomes associated with new incoming data, the child data centre provides a transformation to reproduce the change from the outcomes cached and sends the transformation to the single parent data centre.

3. The method according to claim 1, wherein
in the execution stage, if communication between the single parent data centre and a child data centre among the child data centres in the cluster is interrupted, the single parent data centre uses outcomes from another of the child data centres in the cluster to carry on with the sequence of outcomes.

4. The method according to claim 1, wherein the child data centres in the cluster are formed based on data centre parameters including any of: data size, expected tasks and data centre allowable operations and on data centre proximity factors including any of: physical proximity, network connection and regional location.

5. The method according to claim 1, wherein the preparation stage includes:
providing, for the data centres $D_i$, uplink bandwidth of a child data centre $W_i^{ul}$ among the child data centres in the cluster towards the single parent data centre, and downlink bandwidth $W_i^{dl}$ from the single parent data centre towards the child data centre and size of the child data centre $s_i$.

6. The method according to claim 1, further comprising:
relocating data and a task under defined conditions, the relocating including transferring data among the child data centres in the cluster from an original child data centre to a destination child data centre and carrying out the task at the destination child data centre.

7. The method according to claim 6, wherein the defined conditions take into account an amount of time required to transport the data which is transferred.

8. The method according to claim 6, wherein
the defined conditions are defined based on uplink bandwidth of the child data centre $W_i^{ul}$ towards the single parent data centre, downlink bandwidth $W_i^{dl}$ from the single parent data centre towards the child data centre and size of the child data centre $s_i$ and calculate a ratio of data to be moved to the original child data centre to data moved from the original child data centre during data relocation.

9. The method according to claim 1, wherein:
the query is entered into the network of data centres at a root data centre which is an overall parent in a hierarchy of the data centres;
the root data centre sending the tasks via any intermediate parent data centre to child data centres which are leaf data centres forming a lowest level of the hierarchy.

10. The method according to claim 1, further comprising:
using, for each child data centre in the cluster, uplink bandwidth of the data centre $W_i^{ul}$ towards the single parent data centre, and size of the data centre $s_i$ to determine selection of a subset θ of the child data centres for executing the task, wherein the size of the subset θ is preset to be greater than a threshold and the selection is to 4 minimize the potential uplink communication.

11. A parent data centre in a network of data centres for executing a query, wherein
the data centres are arranged in a dynamic hierarchical cluster topology of the parent data centre and child data centres, based on information relating to data centre parameters and/or proximity provided by each data centre, each child data centre having its own local data sequence which is to be processed by individual analysis tasks of the query; the child data centres together forming a cluster of similar and/or proximate data centres, the parent data centre being the only parent for the cluster;
the parent data centre comprising:
a processor and an input-output component, I/O, configured to provide the information relating to data centre parameters and/or proximity to other data centres; and further configured to receive the tasks, to send the tasks to the child data centres in the cluster; and to receive from each child data centre in the cluster a sequence of outcomes derived from the local data sequence and the tasks; and
a storage configured to cache executed tasks executed by each child centre in the cluster and the sequence of outcomes of the tasks executed by each child data centre in the cluster until the query is completed.

12. The parent data centre according to claim 11, wherein the processor and I/O are configured to receive user queries and to form the hierarchical cluster topology.

13. A child data centre among child date centres in a network of data centres for executing a query, wherein
the data centres are arranged in a dynamic hierarchical cluster topology of a parent data centre and the child data centres, based on information relating to data centre parameters and/or proximity provided by each data centre, the child data centre having its own local data sequence which is to be processed by individual analysis tasks of the query, the child data centres together forming a cluster of similar and/or proximate data centres, the parent data centre being the only parent for the cluster;
the child data centre comprising:
a processor and an input-output component, I/O configured to provide the information relating to data centre parameters and/or proximity to other data centres, and further configured to receive the tasks from the parent data centre and to send the parent data centre a sequence of outcomes derived from the local data sequence and the tasks; and
a storage configured to cache tasks that the child data centre has executed and the sequence of outcomes of the tasks that the child data centre has executed until the query is completed.

14. A network of data centres for executing a query comprising a parent data centre according to claim 11 and a plurality of child data centres according to claim 13.

* * * * *